Sept. 16, 1958
R. S. ZEBARTH
2,851,723
METHOD OF SCALDING POULTRY
Filed April 11, 1955
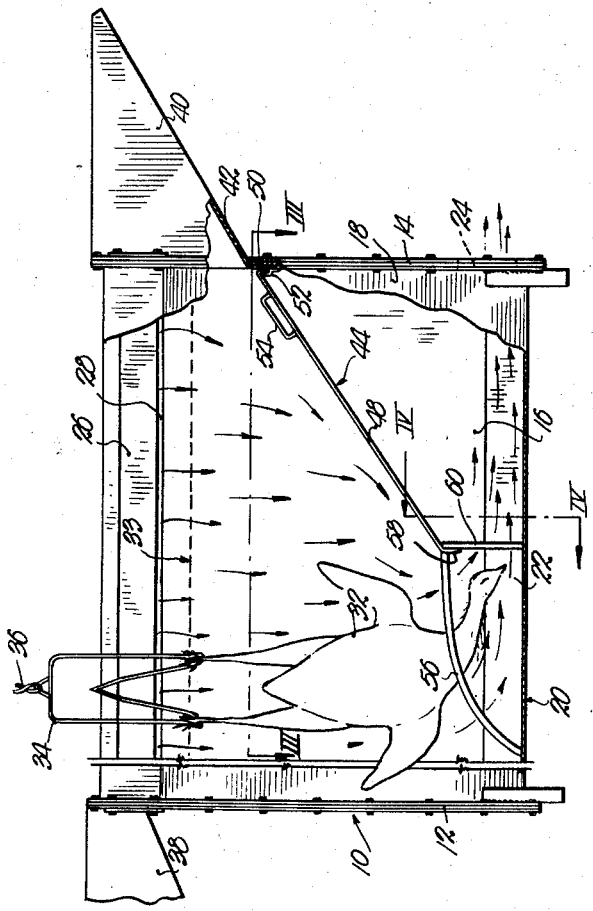
INVENTOR.
Ralph S. Zebarth
BY
ATTORNEY.

United States Patent Office 2,851,723
Patented Sept. 16, 1958

2,851,723
METHOD OF SCALDING POULTRY

Ralph S. Zebarth, Hickman Mills, Mo., assignor to Gordon Johnson Equipment Company, Kansas City, Mo., a corporation of Missouri Application April 11, 1955, Serial No. 500,490

6 Claims. (Cl. 17—45)

This invention relates to equipment utilized in the dressing of poultry, and specifically to an improved scalder through which the poultry is advanced in a continuous operation, the primary object being to provide structure for scalding the poultry through use of a relatively large amount of water flowing over the poultry as it is conveyed, the said structure having an arrangement of parts especially designed to more effectively scald the neck of the bird than has been made possible through use of conventional scalders.

Among the many methods heretofore utilized in the scalding of poultry, one of the most satisfactory is the utilization of streams of scalding liquid that are permitted to fall upon the birds as the same are advanced through a scalding tank. The force of such liquid being exceedingly great, the feathers of the poultry are subjected to a rather violent scalding action, simplifying the subsequent removal thereof by conventional feather picking machines or by other means. However, such scalding method does not properly scald the neck, in part because it is protected from the action of the falling liquid by the body of the bird. And, so far as I am aware, no other method has heretofore been provided which will solve the problem in a single scalding step without damaging the skin of the bird.

It is accordingly the most important object of the instant invention to provide a scalder having an inclined ramp along which the poultry slides as it approaches one end of the tank and is dragged therefrom through use of an overhead conveyor or the like, the ramp having a portion which receives the poultry necks thereby causing the same to be scalded by virtue of the force of the scalding liquid flowing from the scalding tank.

Another important object of this invention is to provide a scalder of the aforementioned character, made in a manner to provide passage means for free flow of the liquid to an outlet opening, the necks of the birds extending into the liquid flowing to the outlet opening so as to subject the neck feathers to a proper scald.

Other objects include the way in which the said inclined ramp is provided with a panel and a number of spaced, upwardly arched members at the lowermost end of the panel for receiving the neck of the bird and subjecting the same to the force of a swiftly moving scalding liquid in an underlying sump while holding the body of the bird out of the sump; the way in which the ramp is supported by a plurality of spaced feet resting on the bottom of the tank; the manner of positioning the ramp as a continuation of an inclined bottom of an open top outlet trough forming a part of the tank; and the way in which the entire neck-scalding adaptor is rendered readily removable from the tank.

In the drawing:

Figure 1 is an end elevational view of a scalding machine for poultry made pursuant to the present invention, parts being broken away for clearness.

Fig. 2 is a fragmentary, side elevational view, parts being broken away to reveal details of construction.

Fig. 3 is a fragmentary, cross-sectional view taken on line III—III of Fig. 2; and Fig. 4 is a fragmentary, cross-sectional view taken on line IV—IV of Fig. 2.

The machine illustrated in the drawing includes an open top scalding tank broadly designated by the numeral 10, having a pair of spaced end walls 12 and 14, together with a pair of side walls 16 and 18 between the walls 12 and 14 as best seen in Fig. 3.

Tank 10 is provided with a bottom 20, preferably shaped as best seen in Fig. 4, to present a longitudinal channel 22 aligned with a liquid outlet opening 24 within the end wall 14.

Delivery structure for scalding liquid, provided along the uppermost open end of the tank 10, includes a pair of longitudinally extending, tubular elements, one of which is shown in Figs. 1 and 2 of the drawing and designated by the numeral 26. Side walls 16 and 18 have longitudinally extending slots 28 communicating with the tubular elements 26 and through which the scalding liquid 30 flows in heavy streams 31 when the machine is placed in operation.

Poultry 32 is advanced through the tank 10 from the end wall 12 to the end wall 14 through the medium of an overhead conveyor (not shown) supporting suitable shackles 34 for the birds 32 and mounted on the lowermost end of flexible supports such as chains 36. An open top trough 38 at the uppermost end of the wall 12 exteriorly of the tank 10, has an inclined bottom (not shown) that slopes upwardly as the wall 12 is approached and along which the birds 32 slide as they approach the tank 10.

The wall 14 is provided with a similar exterior open top trough 40 having an inclined bottom 42 that slopes downwardly as the wall 14 is approached and along which the birds 32 slide as they move out of the tank 10.

It can now be appreciated that the poultry 32 is advanced through the tank 10 centrally thereof and along its longitudinal axis within the scalding liquid 30 having a maintained level substantially at 33. While the force of such large volume of water being poured upon the birds 32 effectively scalds the legs, wings and body of the bird, the neck feathers are normally more difficult to remove and should be subjected to a still more effective scalding action. Furthermore, as can be seen in Fig. 2 of the drawing, the neck is more or less protected by the body of the bird from the action of the liquid gravitating with great force toward the channel 22.

Accordingly, pursuant to the principles of the present invention, there is provided an adaptor broadly designated by the numeral 44 in the nature of an inclined ramp 46 within the tank 10 and sloping upwardly from the bottom 20 thereof to the end wall 14. The ramp 46 includes a flat panel 48 that spans the distance between the side walls 16 and 18 as shown in Fig. 3, and which terminates at its uppermost end adjacent the lower end of the inclined bottom 42.

Releasable means is provided to support the upper end of the panel 48 taking the form of down-turned hook 50 on the panel 44 and a complemental up-turned hook 52 on the inner face of wall 14. A handle 54 on the panel 48 facilitates removal of the adaptor 44 as a unit from within the tank 10.

In addition to the panel 48, the ramp 48 includes a plurality of elongated members 56 that are arched upwardly as seen in Fig. 2, to guide the poultry 32 onto the panel 48, the members 56 being spaced-apart as seen in Figs. 3 and 4 for free flow of the liquid 30 along the channel 22 to the outlet opening 24. The upper ends of the members 56 are attached directly to a downturned flange 58 at the lowermost end of the panel 48 in any suitable manner such as by welding. The lowermost ends of the members 56 rest directly on the bottom 20.

The lower end of the panel 48 and the upper ends of the members 56, are additionally supported by the bottom 20 through the medium of a plurality of feet 60 depending from the panel 48 and likewise attached directly to the flange 58 by welding or otherwise. It is seen in Figs. 1 and 4 of the drawing that the feet 60 are similarly spaced-apart, whereby the same offer little resistance to flow of the liquid 30 along the channel 22 of bottom 20.

It is now clear that, as the poultry 32 is advanced by the conveyor, it moves upwardly along the inclined bottom of trough 38 and then drops into the tank 10 within the scalding liquid 30. As the bird 32 approaches the adaptor 44 and into engagement with the spaced-apart members 56, it is gradually and progressively raised and guided onto the inclined panel 48. The conveyor drags or slides the birds 32 along the adaptor 44 and thence onto the inclined bottom 42 of the trough 40.

Since adaptor 44 extends at an angle from the bottom 20 to the end wall 14 above the outlet opening 24, the birds slide easily up the ramp 46 and the inclined bottom 42 without being damaged. All liquid and foreign matter flows freely to the outlet 24 through the members 56 and the feet 60. Such liquid may be recirculated to the tubular elements 26 or the latter supplied with scalding liquid in any other suitable manner (not herein shown).

While the novel method of scalding poultry pursuant to the instant invention has, in part, been explained in setting forth the appartaus chosen for carrying out the method, it is to be pointed out that the method contemplates primarily subjecting the neck feathers, which are ordinarily most difficult to remove, to the great force of a swiftly moving stream or current of scalding liquid while maintaining the body of the bird out of the sump or channel 22 within which such current is flowing toward outlet 24, all as illustrated in Fig. 2.

While the scalding liquid flowing in the channel 22 may emanate from any suitable source, it is advantageous to obtain such supply of scalding liquid from an overlying scald, thereby combining the neck scalding operation with the scalding of the remainder of the bird 32.

Therefore, in accordance with the method of the instant invention, the neck is scalded separately from the body but simultaneously with the scalding of the body by virtue of the relatively heavy streams or spray of scalding liquid emanating from the vats 26 or any other suitable source. By collecting the scalding liquid that is poured over the body of the bird within the sump 22 and permitting such collected liquid to flow in a heavy swift stream, longitudinally of the sump 22 through the outlet 24, the supply of scalding liquid for the necks need not be obtained from a separate source.

It is to be noted also, that in accordance with the method of the present invention, the birds 32 are advanced by movement of the overhead conveyor and, therefore, the shackles 34 from which the birds 32 are suspended, in the same direction as the direction of flow of the liquid in sump 22, but the speed of advancement of the birds 32 should be less than the rate of flow of the liquid along the sump 22 so that the neck of the bird 32 will tend to be pulled toward the outlet 24 as shown in Fig. 2. This is accomplished further by the provision of the spaced-apart, arched members 56 through which the neck is permitted to extend and which arched members operate to hold the body of the bird out of the sump 22.

As the bird 32 is advanced, the neck may even be pulled between the spaced-apart feet 60 and into underlying relationship to the panel 48. However, the necks of the birds 32 should not be permitted to be pulled through the outlet 24 and thereby become damaged. Therefore, the necks are pulled out of the sump 22 as the bodies of the birds slide onto the panel 48. The bodies of the birds continue to be subjected to the heavily gravitating liquid even after the necks have been pulled out of the sump 22 and as the necks slide up the panel 48 they are still further subjected to the scalding liquid emanating from the outlets 28.

Noteworthy also is the fact that, by virtue of the force of the current in sump 22, the feathers of the neck which normally lie flatly against the neck and extend toward the body of the bird, are pulled upwardly toward the head of the bird, thereby subjecting the same to a rather violent scalding action without damaging the skin of the neck.

Having thus described the invention, what is claimed as new and desired to be secured by Letters Patent is:

1. A method of scalding poultry which comprises pouring a scalding liquid over the poultry; collecting the liquid in a sump underlying the poultry; draining the liquid from said sump to produce a swift current flowing in one direction; and dipping the necks of said poultry into said current.

2. A method of scalding the neck of a bird which comprises dipping said neck into a stream of a scalding liquid flowing continuously in one direction while holding the remainder of the bird out of the stream.

3. A method of scalding a bird which comprises pouring heavy streams of a scalding liquid for continuous flow in one direction in a swift current; suspending the bird to be scalded by its legs; and advancing the bird through the liquid with said neck subjected to the force of said current, the rate of advancement of the bird being less than the rate of flow of said current whereby the neck tends to be pulled in said one direction by the current.

4. A method of scalding a bird which comprises pouring heavy streams of a scalding liquid for continuous flow in one direction in a swift current; suspending the bird to be scalded by its legs; advancing the bird in the direction of said flow to move the same through the liquid with said neck subjected to the force of said current, the rate of advancement of the bird being less than the rate of flow of said current whereby the neck tends to be pulled in said one direction by the current; and pulling the neck out of said current while the bird is still subjected to said liquid.

5. A method of scalding a bird which comprises advancing the neck thereof at a predetermined speed of travel through a stream of a scalding liquid flowing in the same direction as said neck and at a faster rate than said speed of travel of the neck while maintaining the remainder of the bird out of the stream.

6. A method of scalding a bird which comprises pouring a scalding liquid over the bird; collecting the liquid in a bath completely immersing the bird; draining the liquid from the bath to produce a current; and dipping the neck of the bird into said current while the bird is immersed.

References Cited in the file of this patent

UNITED STATES PATENTS

| | | |
|---|---|---|
| 1,672,555 | Barker et al. | June 5, 1928 |
| 1,730,964 | Barker et al. | Oct. 8, 1929 |
| 2,667,661 | Long | Feb. 2, 1954 |
| 2,710,985 | Zebarth | June 21, 1955 |
| 2,727,273 | Long | Dec. 20, 1955 |

FOREIGN PATENTS

| | | |
|---|---|---|
| 112,931 | Australia | Apr. 16, 1941 |